United States Patent [19]

Kanota et al.

[11] Patent Number: 4,964,000
[45] Date of Patent: Oct. 16, 1990

[54] CIRCUIT FOR SEPARATING SIMULTANEOUSLY REPRODUCED PCM AND ATF SIGNALS HAVING AT LEAST PARTIALLY OVERLAPPING FREQUENCY BANDS

[75] Inventors: Keiji Kanota, Kanagawa; Noboru Murabayashi, Tokyo, both of Japan

[73] Assignee: Sony Corporation, Tokyo, Japan

[21] Appl. No.: 275,413

[22] Filed: Nov. 23, 1988

[30] Foreign Application Priority Data

Nov. 26, 1987 [JP] Japan .................................. 62-298833

[51] Int. Cl.$^5$ ........................ G11B 5/584; G11B 5/09; G11B 20/10
[52] U.S. Cl. ................................ 360/77.14; 360/19.1; 360/27; 360/32; 360/77.01; 369/47; 369/59
[58] Field of Search ............... 358/310, 330, 342, 343; 360/18–20, 27, 28, 32, 77.07, 77.08, 77.11, 77.12, 77.14, 77.15, 77.01, 39, 40; 369/47–49, 59

[56] References Cited

U.S. PATENT DOCUMENTS 4,509,083  4/1985  Nakano ............................. 360/19.1
4,748,517  5/1988  Shibata et al. ..................... 358/310

Primary Examiner—Alan Faber
Assistant Examiner—Steven R. Garland
Attorney, Agent, or Firm—Alvin Sinderbrand

[57] ABSTRACT

In an apparatus, such as, an 8-mm VTR, in which a pilot signal and a digital signal modulated by an information signal, and occupying frequency bands that overlap at least in part, are recorded together as an addition signal in a track on a recording medium; a D.C. component of the addition signal reproduced from the track is detected and compared, in a voltage comparator, with the level of the reproduced addition signal so as to provide the digital signal as an output of the comparator, and such output of the voltage comparator is subtracted from the reproduced addition signal so as to provide the pilot signal without error by reason of the digital signal. Further, the pilot signal and cross-talk from adjacent tracks obtained from the first-mentioned subtraction is, in turn, subtracted from the reproduced addition signal for obtaining the digital signal therefrom, and the D.C. component of the digital signal obtained from the second subtraction is detected and compared with the level of the digital signal obtained from the second substration for obtaining therefrom the digital signal with any errors therein due to the pilot signal and other cross-talk from adjacent tracks being suppressed.

16 Claims, 3 Drawing Sheets

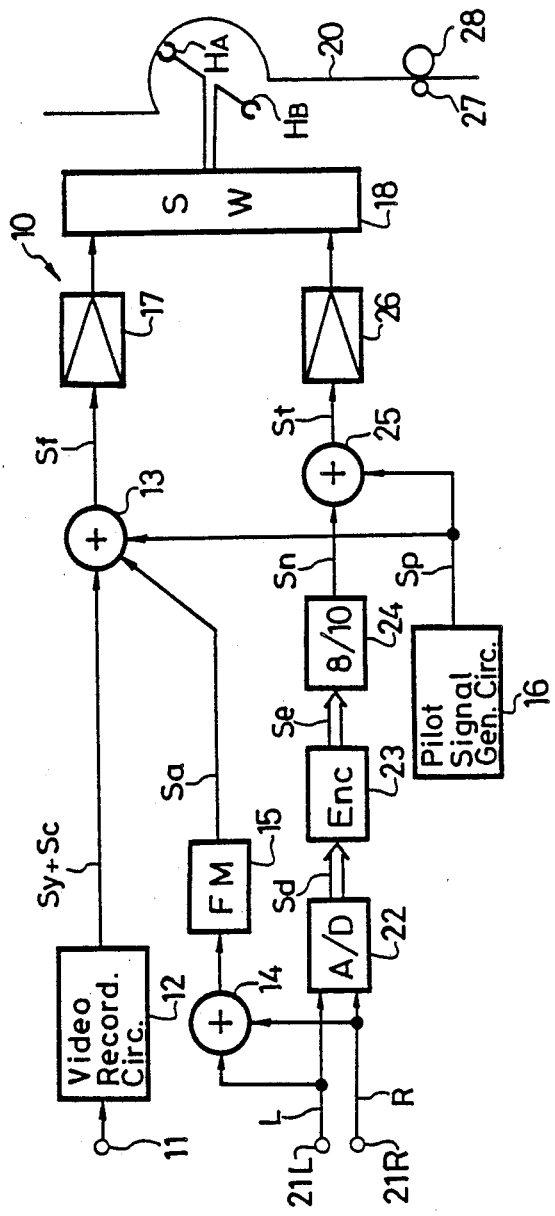
F I G. 3
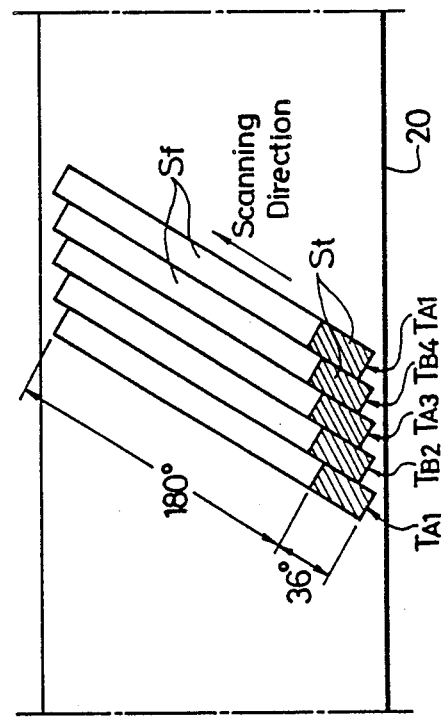
F I G. 4

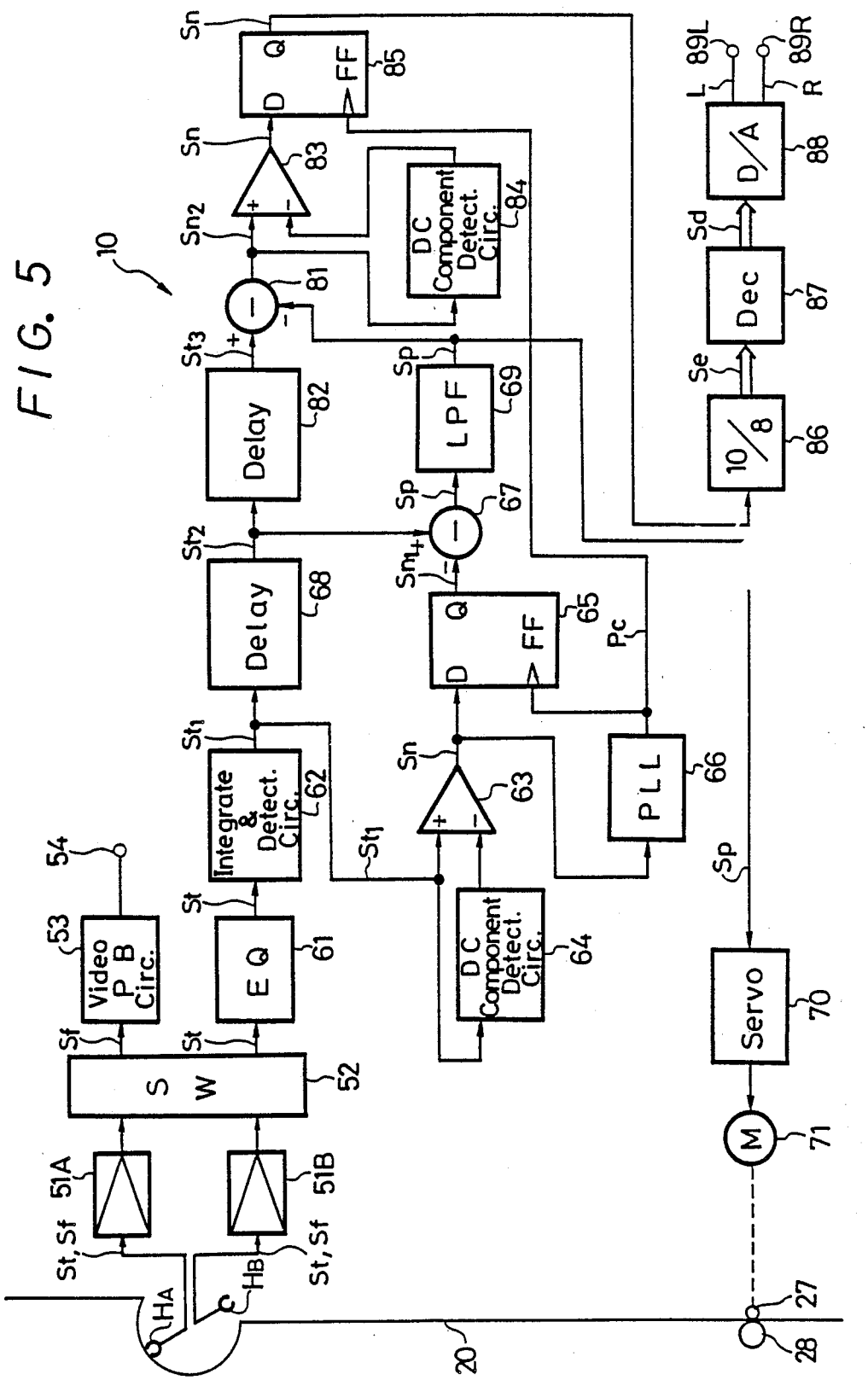

CIRCUIT FOR SEPARATING SIMULTANEOUSLY REPRODUCED PCM AND ATF SIGNALS HAVING AT LEAST PARTIALLY OVERLAPPING FREQUENCY BANDS

BACKGROUND OF THE INVENTION

1. Field of the Invention

This invention relates generally to information recording and reproducing apparatus and, more particularly, is directed to a circuit for separating simultaneously reproduced signals having at least partially overlapping frequency bands.

2. Description of the Prior Art

It is known to employ an 8-mm video tape recorder (VTR) for the reproducing of digital data recorded on a magnetic tape. In such 8-mm VTR, an FM audio signal is interposed between the frequency band of an FM luminance signal and the frequency band of a low-frequency converted chrominance signal, and the resulting combined signal, which is hereinafter simply referred to as the video signal, is recorded in the main portions of successive adjacent, oblique or slant tracks extending across a magnetic recording tape. It is further known that, in order to record and/or reproduce audio signals of higher quality by means of the 8-mm VTR, the audio signal is PCM-encoded, time-base compressed and recorded in overscan sections situated at one end of the oblique record tracks, for example, as disclosed in U.S. Pat. No. 4,551,771, issued Nov. 5, 1985, and having a common assignee herewith. However, in the known arrangement in which the audio signal is PCM encoded for recording in the existing 8-mm VTR, the sampling frequency is twice the horizontal frequency of the video signal, that is, approximately 31.5 kHz in the case of a standard NTSC video signal, and the PCM audio signal is quantized in non-linear eight bits.

On the other hand, in other digital audio recording and/or reproducing apparatus, such as, digital audio tape (DAT) recorders and compact disk (CD) players the adopted standards for the PCM audio signal provide a sampling frequency of 44.1 kHz or 48 kHz and a quantized bit number of 16 bits, for example, as shown in U.S. Pat. No. 4,577,180 issued Mar. 18, 1986, or U.S. Pat. No. 4,617,552, issued Oct. 14, 1986, and each also having a common assignee herewith. Therefore, the quality of the PCM audio signal, as recorded and reproduced by the known 8-mm VTR, is not as high as the quality of the audio signals obtained with DAT recorders or CD players.

Although it has been proposed to convert the 8-mm VTR audio signal to a PCM signal having a standard similar to that employed in the other digital audio apparatus, such as, CD players and DAT recorders, the quantity of data that then needs to be recorded is increased to more than twice that characterizing the actual PCM signal. However, it is not possible to modify either the magnetic characteristic of the tape or the length of the overscan section of each track in which the PCM audio signal is recorded so that a different method needs to be employed for recording the increased amount of data representing the high-quality PCM audio signal. More particularly, in the case of the standard PCM audio signal recorded in the overscan section of each record track by means of the 8-mm VTR, such standard PCM audio signal is converted, for recording, to a bi-phase mark signal which, for example, as the frequency band indicated in broken lines at Sb in FIG. 1B. On the other hand, when a high-quality PCM audio signal is to be recorded by means of an 8-mm VTR, such signal is recorded, for example, in the form of an NRZ signal. Since the NRZ signal occupies a relatively narrower band width, even when the quantity of data is increased, as for the high-quality PCM audio signal, the corresponding NRZ signal will merely occupy a frequency band, for example, as indicated by the solid line Sn on FIG. 1B. Therefore, the NRZ signal corresponding to the high-quality PCM audio signal can be recorded and reproduced by the 8-mm VTR in place of the originally employed PCM signal, that is, the PCM signal having a sampling frequency of 31.5 kHz and which is quantized in non-linear eight bits.

However, the NRZ signal Sn includes a D.C. component and the increase in the quantity of data for recording and reproducing a high-quality audio signal causes the lower band components of the NRZ signal to be correspondingly increased. The lower band region of the NRZ signal includes a tracking pilot signal Sp used for automatic track following (ATF) during reproducing or playback and having a frequency which is approximately in the range between 103 kHz and 165 kHz, for example, as disclosed in U.S. Pat. No. 4,509,083 and U.S. Pat. No. 4,658,309. Therefore, if the pilot signal Sp is added to the NRZ signal Sn for recording simultaneously with the latter in the overscan section of each track, and if the reproduced pilot signal is separated from the reproduced NRZ signal on the basis of the frequency thereof, for example, by a band pass filter, the separated reproduced pilot signal inevitably includes lower band components of the reproduced NRZ signal which results in tracking errors. The reproduced NRZ signal Sn also includes the pilot signal Sp, for example, as shown in FIG. 2A, which increases the error rate of the PCM audio signal.

In order to avoid the foregoing problems, in the DAT recorder in which the frequency bands occupied by the PCM audio signal and the pilot signal at least partially overlap, the pilot signal is recorded separately from the PCM signal, for example, in front and rear portions of the recording area for the PCM signal. However, such arrangement for ensuring that the reproduced PCM signal and pilot signal can be satisfactorily separated or time-demultiplexed reduces the area of the recording medium available for receiving the PCM signal and thereby reduces the recording density of the PCM signal.

OBJECTS AND SUMMARY OF THE INVENTION

Accordingly, it is an object of the present invention to provide an apparatus in which a pilot signal and a digital signal modulated by an information signal and occupying frequency bands that overlap, at least in part, can be recorded together as an addition signal in a track on a recording medium, and then effectively separated from the reproduced addition signal while avoiding the previously mentioned problems of the prior art.

More specifically, it is an object of this invention to provide an apparatus, such as, an 8-mm VTR, in which a tracking pilot signal and a high-quality PCM audio signal occupying overlapping frequency bands are recorded together as an addition signal in overscan sections of parallel slant tracks on a magnetic recording tape and, upon reproducing of such addition signal, the tracking pilot signal and the high-quality PCM audio signal can be effectively separated from each other without distortion or errors arising by reason of their joint presence, with overlapping frequency bands, in the addition signal.

In accordance with an aspect of this invention, in an apparatus for reproducing an addition signal recorded in a track on a recording medium and which is the result of the addition of a pilot signal to a digital signal modulated by an information signal, with the digital signal and pilot signal occupying respective frequency bands that overlap, at least in part; a circuit for separately obtaining the pilot signal and the digital signal from the reproduced addition signal comprises means for detecting a DC component of the reproduced addition signal, voltage comparing means for comparing the level of the reproduced addition signal with the detected DC component thereof and extracting the digital signal as an output therefrom, and subtracting means for subtracting the output of the voltage comparing means from the reproduced addition signal and thereby providing the pilot signal as an output from the subtracting means.

In accordance with another aspect of this invention, an apparatus, as aforesaid, is further provided with second subtracting means for subtracting the output of the first-mentioned subtracting means from the reproduced addition signal for obtaining the digital signal therefrom, means for detecting a DC component of the digital signal obtained from the second subtracting means, and second digital signal obtained from the second subtracting means with the detected DC component thereof for obtaining the digital signal with any errors therein due to the pilot signal and other cross-talk from adjacent tracks being suppressed.

The above, and other objects, features and advantages of the invention, will become apparent from the following detailed description of a preferred embodiment thereof which is to be read in conjunction with the accompanying drawings, throughout which the same reference numerals designate corresponding elements and components.

BRIEF DESCRIPTION OF THE DRAWINGS

FIG. 3 is a circuit block diagram showing a recording section of an 8-mm VTR in accordance with an embodiment of the present invention;

FIG. 4 is a schematic view showing a length of magnetic tape and the track pattern formed thereon during the operation of the recording section shown in FIG. 3; and FIG. 5 is circuit block diagram showing a reproducing section of the 8-mm VTR in accordance with an embodiment of the present invention.

DETAILED DESCRIPTION OF A PREFERRED EMBODIMENT

Figure 1A:
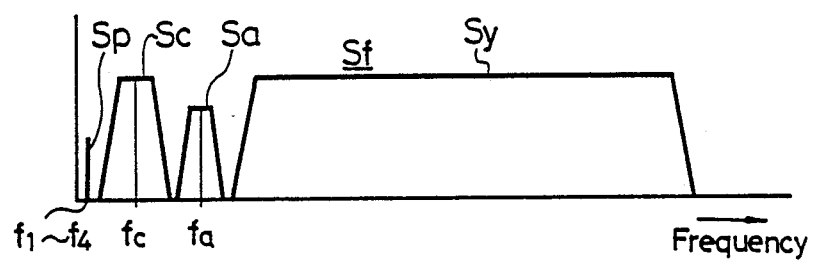
FIGS. 1A and 1B are graphs showing frequency spectra of signals that may be recorded in the main portions and overscan sections, respectively, of slant record tracks extended across a magnetic recording tape in an 8-mm VTR.

Referring initially to FIG. 3, it will be seen that, in the recording system of a 8-mm VTR 10 to which the present invention is applied, a color video signal, for example, in accordance with the NTSC standard, is supplied through an input terminal 11 to a video recording circuit 12. In such video recording circuit 12, the luminance component of the color video signal is FM-modulated to provide the signal Sy shown in FIG. 1A, and the chrominance subcarrier component of the color video signal is frequency down-converted to a chrominance subcarrier signal Sc occupying a lower band than the FM-modulated luminance signal Sy. By way of example, the carrier frequency fc of the down-converted chrominance subcarrier signal Sc may be 47.25 $f_h$, in which $f_h$ represents the horizontal frequency, that is, the carrier frequency fc is about 743 kHz. The frequency modulated luminance signal Sy and the down-converted chrominance subcarrier signal Sc are supplied together to one input of an adder circuit 13.

Left-channel and right-channel stereo audio signals L and R are supplied through input terminals 21L and 21R, respectively, to respective inputs of an adder circuit 14 which provides, at its output, a monaural audio signal supplied to a frequency modulating circuit 15 in which the monaural signal is frequency modulated to provide an FM audio signal Sa having a center or carrier frequency fa, for example, of 1.5 MHz, selected so that the band of the FM audio signal Sa is positioned between the frequency modulated luminance signal Sy and the down-converted chrominance subcarrier signal Sc. Such FM audio signal Sa is supplied to another input of the adder circuit 13.

A pilot signal generating circuit 16 is provided for generating a pilot signal Sp for use in effecting tracking servo during reproducing operation of the 8-mm VTR. As is known, the pilot signal Sp has its frequency changed from field-to-field in accordance with the following cycle which is repeated every four fields:

$f_1 = 378/58 \, f_h$ or approximately 103 kHz
$f_2 = 378/50 \, f_h$ or approximately 119 kHz
$f_3 = 378/36 \, f_h$ or approximately 165 kHz
$f_4 = 378/40 \, f_h$ or approximately 149 kHz The signal Sp having its frequency changed from field-to-field in accordance with the above four-field cycle has a frequency, at all times, below the band of the down-converted chrominance subcarrier signal Sc and is also supplied to a respective input of the adder circuit 13. Thus, the adder circuit 13 frequency-multiplexes the signals Sp, Sc, Sa and Sy to form a combined signal Sf (FIG. 1A) which is supplied from the output of the adder circuit 13 through a recording amplifier 17 to a respective input of a switching circuit 18.

Figure 1B:
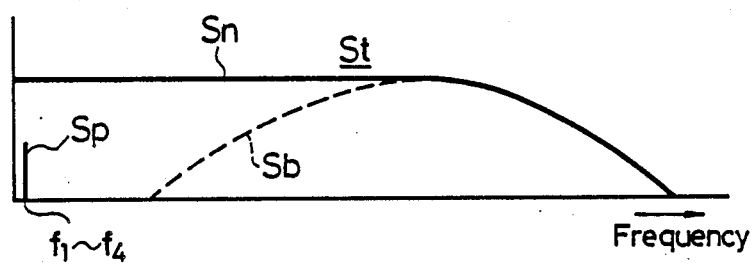

The signals L and R from the input terminals 21L and 21R are also supplied to an analog-to-digital (A/D) converter 22 wherein each of the signals L and R is PCM-coded with a sampling frequency of 48 kHz and a quantizing bit number of 16 bits. Further, the resulting PCM signals corresponding to the signals L and R are alternately combined sample-by-sample to form a parallel digital signal Sd which is supplied from the output of the converter 22 to an encoder 23. In the encoder 23, error correcting data, for example, a CIRC error code, and user's bits are added to each field portion of the digital signal Sd, whereupon each field portion of the Sd and the added data are interleaved and time-base-compressed so as to provide the encoded output signal Se which occupies approximately the last 1/5 th portion of the respective field. The encoded output signal Se from the encoder 23 is supplied to a converting or modulating circuit 24 in which, for example, each eight bits of the signal Se are converted to a ten-bit serial NRZ signal Sn which has a particular corresponding relationship with the eight-bit configuration Se. A modulation system similar to the foregoing 8/10 modulation is described in detail in the previously mentioned U.S. Pat. No. 4,577,180 and U.S. Pat. No. 4,617,552. The 8/10 conversion or modulation is effected by the converting circuit 24 so as to distribute the NRZ signal Sn in a readily recordable and reproducible band, as shown in FIG. 1B, and so that the clock can be easily extracted upon reproduction.

The NRZ signal Sn is supplied to one input of an adder circuit 25 which, at another input, receives the pilot signal Sp from the generating circuit 16. The adder circuit 25 provides, as its output, an addition signal St which corresponds to the sum of the pilot signal Sp and the NRZ signal Sn during the last 1/5 th portion of each field period. Such addition signal St is supplied through a recording amplifier 26 to a respective input of the switching circuit 18.

The switching circuit 18 is controlled in response to a suitable timing signal (not shown) which is synchronized with the rotation of diametrically opposed rotary heads HA and HB so as to supply successive fields of the combined signal Sf (FIG. 1A) alternately to rotary heads HA and HB, and further to supply the addition signal St alternately to the rotary heads HB and HA during the last 1/5 th of the fields during which the combined signal Sf is being alternately supplied to the heads HA and HB, respectively.

As earlier noted, the heads HA and HB are diametrically opposed or angularly spaced apart by 180° and are suitably rotated at the frame frequency in synchronism with the color video signal fed to the input terminal 11. A magnetic tape 20 is helically wrapped around the peripheral surface of a guide drum (not shown) associated with the rotary heads HA and HB to an angular extent slightly more than 216°; and is longitudinally transported at a constant linear velocity by means of a rotated capstan 27 and a pinch roller 28. The heads HA and HB have respective gaps with different azimuth angles so that, as the tape is transported and the heads HA and HB are rotated at a rotary speed equal to the frame frequency during a recording operation, the heads HA and HB record alternately with the respective azimuth angles in successive slant tracks extending adjacent to each other across the tape, as at $T_{A1}$, $T_{A2}$ and at $T_{B2}$, $T_{B4}$, respectively, on FIG. 4.

During the scanning of an overscan section corresponding to the angular distance of 36° from the beginning of each of the tracks $T_{A1}$, $T_{B2}$, $T_{A3}$ and $T_{B4}$, space the switching circuit 18 supplies the addition signal St (FIG. 1B) to the head HA or HB then scanning the respective track and, during the scanning of the remaining or main portion of the same track corresponding to the angular distance of 180°, the switching circuit 18 supplies the signal Sf (FIG. 1A) to the respective head HA or HB. Thus, for example, the rotary head HA records the addition signal St comprised of the NRZ signal Sn and the tracking pilot signal Sp in the overscan section of each of the tracks $T_{A1}$ and $T_{A3}$ on FIG. 4, and further records the combined signal Sf comprised of the FM luminance signal Sy, the FM audio signal Sa, the down-converted chrominance carrier signal Sc and the tracking pilot signal Sp in the main portion of each of such tracks $T_{A1}$ and $T_{A3}$. Similarly, the rotary head HB records the addition signal St and the combined signal Sf in the overscan section and in the main portion, respectively, of the tracks $T_{B2}$ and $T_{B4}$ on FIG. 4. Furthermore, the frequency of the pilot signal Sp contained in the signals St and Sf recorded in the tracks $T_{A1}$, $T_{B2}$, $T_{A3}$ and $T_{B4}$ is charged to be the previously noted frequencies f1, f2, f3 and f4, respectively, and such changes in the frequency of the tracking pilot signal Sp are repeated cyclically for every four tracks.

It will be appreciated that the recording section described above with reference to FIG. 3 and the recording format employed thereby are similar to those incorporated in the presently available 8-mm VTRs, with the exception that the signal St recorded, in accordance with this invention, in each of the overscan sections includes, in addition to the tracking pilot signal Sp, the high-quality NRZ or digital signal Sn obtained with a sampling frequency of 48 kHz and a quantized bit number of 16-bits, rather than the standard quality PCM audio signal obtained with a sampling frequency of 31.5 kHz and quantized in non-linear 8-bits, and which is converted, for recording to a bi-phase mark signal having the frequency band indicated in broken lines at Sb on FIG. 1B.

Referring now to FIG. 5, it will be seen that, in the reproducing section of an 8-mm VTR embodying the present invention, the signals St and Sf are sequentially reproduced from the overscan section and the main portion of each of the tracks $T_{A1}$, $T_{A3}$ by the head HA, and from the overscan section and main portion of each of the remaining tracks $T_{B2}$, $T_{B4}$ by the other head HB. These signals reproduced by the heads HA and HB are supplied through reproducing amplifiers 51A and 51B, respectively, to a switching circuit 52 which, as in the case of the switching circuit 18 of the recording section, is suitably controlled in synchronism with the rotation of the heads HA and HB. More specifically, during the scanning of the main portions of the respective tracks by the heads HA and HB, the switching circuit 52 directs the successive fields of the combined signal Sf being then alternately reproduced by the heads HA and HB to a video playback or reproducing circuit 53 in which the combined signal Sf is subjected to processing which is the converse of that performed in the video recording circuit 12 so as to derive the original color video signal which is delivered to an output terminal 54.

Figure 2A:
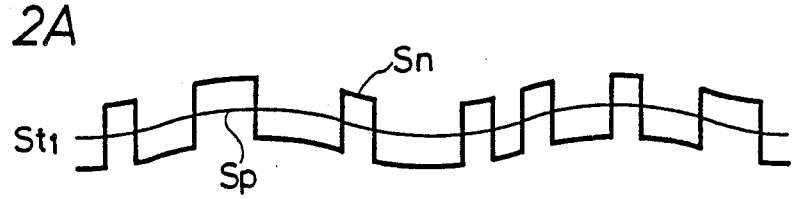
FIGS. 2A-2D are waveforms to which reference will be made in explaining the processing of signals in apparatus according to the present invention.
Figure 2B:

During the 1/5 th portion of each field period in which the head HA or HB scans the overscan section of a respective track on the tape 20, the switching circuit 52 directs the addition signal St then being reproduced from the scanned overscan section through a reproducing equalizer circuit 61 to an integrating and detecting circuit 62 in which differentiation characteristics of the heads HA and HB included in the signal St are removed so as to provide the signal St1 shown in FIG. 2A. The signal St1 from the circuit 62 is supplied to the non-inverting input of a voltage comparing circuit 63 and also to a direct current (DC) component detecting circuit 64 which provides, as its output, a DC component of the signal St1 supplied to an inverting input of the comparing circuit 63. Thus, the voltage comparing circuit 63 determines whether the level of the signal St1 is "0" or "1" and, in accordance with such detected level of the signal, an NRZ signal Sn (FIG. 2B) is provided at the output of the voltage comparing circuit 63.

Such signal Sn is applied to the D terminal of a D-type flip-flop 65 and also to a phase lock loop (PLL) 66. The PLL 66 generates a clock pulse Pc which is in synchronism with the signal Sn and which is supplied to the clock input of the flip-flop 65. Thus, the flip-flop 65 generates an output signal Sn1 which is synchronized with the clock pulse Pc and which is similar to the NRZ signal Sn. The output Sn1 from the flip-flop 65 is supplied to a (−) input of a subtracting circuit 67.

Figure 2C:
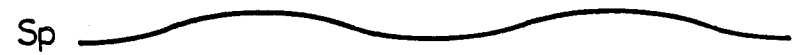

Simultaneously, the signal St1 from the detecting circuit 62 is delayed by a delay circuit 68 for a delay time corresponding to the processing time required by the circuit 63 and the flip-flop 65, whereupon the resulting delayed signal St2 is applied to a (+) input of the subtracting circuit 67 in which the signal Sn1 is subtracted from the signal St2 so as to provide the pilot signal Sp (FIG. 2C) at the output of the subtracting circuit 67. Such pilot signal Sp is supplied through a low pass filter 69, which removes unnecessary high frequency band components thereof, to a servo circuit 70 which, in turn, controls the driving of a capstan motor 71 by which the capstan 27 is driven. The servo circuit 70 may be arranged, as in the presently available 8-mm VTR, for controlling the motor 71 in a matter to ensure that the transportation of the magnetic tape 20 is suitable regulated for causing the heads HA and HB to correctly scan the tracks $T_{A1}$, $T_{A3}$ and the tracks $T_{B2}$, and $T_{B4}$, respectively. It will be appreciated that, such servo control aims at positioning the head HA or HB, during its scanning along a track, so that the levels of the cross-talk components contained in the signal Sp from the tracks situated at the opposite sides of the track being scanned are equal to each other.

Figure 2D:

The pilot signal Sp from the low pass filter 69 is also supplied to a (−) input of a second subtracting circuit 81. The delayed signal St2 from the delay circuit 38 is supplied to a delay circuit 82 to be further delayed by the latter for a delay time corresponding to the processing time required by the first-mentioned subtracting circuit 67 and the low pass filter 69. The resulting further delayed signal St3 from the output of the delay circuit 32 is supplied to a (+) input of the second subtracting circuit 81. Thus, the pilot signal Sp from the low pass filter 69 is subtracted from the delayed signal St3 so as to derive an NRZ signal Sn2 from the output of the subtracting circuit 81 which corresponds to the signal shown in FIG. 2D. Such signal Sn2 is supplied to a non-inverting input of a second voltage comparing circuit 83, and also to an input of a DC component detecting circuit 84 in which the DC component of the signal Sn2 is extracted and supplied to an inverting input of the voltage comparing circuit 83. The levels "0" and "1" of the signal Sn2 are again determined relative to the DC level thereof in the voltage comparing circuit 83 which, on the basis thereof, provides the NRZ signal Sn in which errors due to the pilot signal have been suppressed.

A D-type flip-flop 85 has a D input receiving the signal Sn from the output of the voltage comparing circuit 83 and a clock input which receives the clock pulse Pc from the PLL 66. Thus, the flip-flop 85 provides, as its output, the signal Sn synchronized with the clock pulse Pc. Such synchronized signal Sn is supplied to a 10/8 converting circuit 86 which reconverts the signal Sn from its 10-bit configuration to that of the original 8-bit parallel signal Se. Such reconverted signal Se is supplied to a decoder 87 which effects time-base expansion, error correction, error concealment and so on, for decoding or return to the form of the original digital signal Sd. Finally, the signal Sd is supplied from the decoder 87 to a digital-to-analog (D/A) converter 88 from which the original stereo audio signals L and R are delivered to output terminals 89L and 89R, respectively.

It is to be particularly noted that, by deriving the reproduced pilot signal Sp by subtracting, from the reproduced addition signal St in the subtracting circuit 67, the signal Sn1 corresponding to the signal Sn derived from the voltage comparing circuit 63 in which the level of the the addition signal St1 has been compared with its DC component detected in the circuit 64, the apparatus according to this invention prevents the loss or attenuation in the reproduced pilot signal Sp of the inter-track cross-talk components required for the tracking servo, whereby exact and stable tracking can be ensured.

Further, the present invention is advantageous in providing the NRZ signal Sn by subtracting the pilot signal Sp, having the inter-track cross-talk components, from the suitably delayed reproduced addition signal St3 in the subtracting circuit 81 and by comparing the resulting signal Sn2, in the voltage comparing circuit 83, with the detected DC component of the signal Sn2 so as to precisely determine whether the level of the signal Sn is "0" or "1". Thus, it is possible to decrease or suppress errors in the signal Sn due to interference from the pilot signal Sp or the like, with the result that the fidelity of the audio signals L and R at the output terminals 89L and 89R is substantially increased.

In accordance with this invention, even if the frequency band occupied by the pilot signal Sp is superimposed on the frequency band of the NRZ signal Sn in the reproduced addition signal St, these signals Sp and Sn are effectively separated with the result that the band width of the NRZ signal Sn can be substantially increased. By reason of the foregoing, in apparatus embodying this invention, the sampling frequency and the quantizing bit number employed in converting the audio signals L and R to the NRZ signal Sn can be substantially increased, for example, to a sampling frequency of 48 kHz and a quantizing bit number of 16-bits, thereby making it possible to substantially improve the frequency characteristics of the reproduced signals L and R, the signal-to-noise (S/N) ratio, dynamic range, distortion characteristics and the like, in recording and reproducing apparatus embodying the invention.

Since the present invention, as described above, ensures the separation of the pilot signal Sp and the NRZ signal Sn from the reproduced addition signal St even though the frequency bands of such signals Sp and Sn overlap, at least in part, the recording level of the pilot signal Sp can be elevated for improving the S/N ratio of the reproduced pilot signal and thereby ensuring a more precise tracking servo operation.

In the above described embodiment of this invention, the audio signals L and R are converted to the NRZ signal Sn to be added to the pilot signal Sp for providing the addition signal St which is recorded. However, if desired, the audio signals L and R may be converted to some other digital signal, such as, an NRZI signal or the like, which has a direct current component and low frequency band components. Further, the encoder 23 and the converting circuit 24 may be operated in accordance with encoding and converting formats other than those described in connection with the illustrated embodiment of the invention.

It is also to be noted that the pilot signal Sp which is added to the digital signal for forming the addition signal St to be recorded may embody information other than the tracking servo information represented by the pilot signal Sp in the illustrated embodiment. Furthermore, the digital signal which is separated, in accordance with the present invention, from the pilot signal may represent information other than the audio signals L and R.

In describing the operation of the reproducing section (FIG. 5) of an apparatus embodying the present invention, reference has been made only to the separation of the pilot signal Sp from the reproduced addition signal St which was recorded in the overscan section of each of the tracks, whereupon the extracted pilot signal Sp is employed for effecting the tracking servo. However, it will be apparent that the pilot signal Sp can be also extracted, in the video playback circuit 53, from the combined signal Sf reproduced from the main portion of each of the tracks, so as to be also useful in effecting the tracking servo. Finally, it will be appreciated that the flip-flop 65 in the reproducing section shown on FIG. 5 may be omitted, that is, the output of the voltage comparing circuit 63 may be applied directly to the (−) input of the subtracting circuit 67.

Having described in detail a preferred embodiment of the invention with reference to the accompanying drawings, it is to be appreciated that the invention is not limited to that specific embodiment and that various changes and modifications may be effected therein by one skilled in the art without departing from the spirit or scope of the invention as defined by the appended claims.

What is claimed is:

1. In an apparatus for reproducing an addition signal recorded in a track on a recording medium and which is the result of the addition of a pilot signal to a digital signal modulated by an information signal, with said digital signal and said pilot signal occupying frequency bands that overlap, at least in part, the combination of:
   reproducing head means for reproducing said addition signal from said track;
   means for detecting a D.C. component of the reproduced addition signal;
   voltage comparing means for comparing the level of the reproduced addition signal in respect to the detected D.C. component thereof and extracting said digital signal as an output therefrom; and
   subtracting means for subtracting said output of said voltage comparing means from said reproduced addition signal and thereby providing said pilot signal as an output from said subtracting means.

2. An apparatus according to claim 1; wherein said information signal is an audio signal with which said digital signal is modulated.

3. An apparatus according to claim 2; wherein said pilot signal is a tracking pilot signal; and further comprising tracking servo means receiving said pilot signal for causing said reproducing head means to precisely scan said track.

4. An apparatus according to claim 3; wherein said pilot signal is superimposed on said digital signal at a low frequency band of the latter.

5. An apparatus according to claim 4; wherein said recording medium is a magnetic tape, said track is one of a succession of adjacent, oblique parallel tracks extending across the magnetic tape, said addition signal, comprised of said digital signal and pilot signal, is recorded in portions of said adjacent oblique tracks at one end of the latter, and said pilot signal and video signals are recorded in remaining portions of said tracks.

6. An apparatus according to claim 1; further comprising:
   second subtracting means for subtracting said output of the first-mentioned subtracting means from said reproduced addition signal for obtaining said digital signal therefrom;
   means for detecting a D.C. component of said digital signal obtained from said second subtracting means; and
   second voltage comparing means for comparing the level of said digital signal obtained from said second subtracting means with the detected D.C. component thereof for obtaining said digital signal with any errors therein being suppressed.

7. An apparatus according to claim 6; wherein said information signal is an audio signal with which said digital signal is modulated.

8. An apparatus according to claim 7; wherein said pilot signal is a tracking pilot signal; and further comprising tracking servo means receiving said pilot signal from said first subtracting means for causing said reproducing head means to precisely scan said track.

9. An apparatus according to claim 8; wherein said pilot signal is superimposed on said digital signal at a low frequency band of the latter.

10. An apparatus according to claim 9; wherein said recording medium is a magnetic tape, said track is one of a succession of adjacent, oblique parallel tracks extending across the magnetic tape, said addition signal, comprised of said digital signal and pilot signal, is recorded in portions of said adjacent oblique tracks at one end of the latter, and said pilot signal and video signals are recorded in remaining portions of said tracks.

11. Recording and reproducing apparatus comprising:
   a recording section including analog-to-digital converting means receiving an information signal to be recorded and providing a digital signal modulated by said information signal, means for generating a pilot signal having a frequency band that overlaps, at least in part, the frequency band of said digital signal, means for adding said pilot signal to said digital signal and providing an addition signal therefrom, and means for recording said addition signal in a track on a recording medium; and
   a reproducing section including means for reproducing said addition signal from said track, means for detecting a D.C. component of the reproduced addition signal, first voltage comparing means for comparing the level of the reproduced addition signal with the detected D.C. component thereof and extracting said digital signal as an output therefrom, first subtracting means for subtracting said output of said first voltage comparing means from said reproduced addition signal and thereby providing said pilot signal as an output from said first subtracting means, second subtracting means for subtracting said output of said first subtracting means from said reproduced addition signal for obtaining said digital signal therefrom, means for detecting a D.C. component of said digital signal obtained from said second subtracting means, and second voltage comparing means for comparing the level of said digital signal obtained from said second subtracting means with the detected D.C. component thereof for obtaining said digital signal with any errors therein due to said pilot signal and other cross-talk from adjacent tracks being suppressed.

12. A recording and reproducing apparatus according to claim 11; wherein said information signal is an audio signal with which said digital signal is modulated.

13. A recording and reproducing apparatus according to claim 12; wherein said pilot signal is a tracking pilot signal; and said reproducing section further includes tracking servo means receiving said pilot signal from said first subtracting means for causing said reproducing head means to precisely scan said track.

14. A recording and reproducing apparatus according to claim 13; wherein said pilot signal is superimposed on said digital signal at a low frequency band of the latter.

15. A recording and reproducing apparatus according to claim 14; wherein said recording medium is a magnetic tape, said track is one of a succession of adjacent, oblique parallel tracks extending across the magnetic tape, said addition signal is recorded in portions of said adjacent oblique tracks at one end of the latter, and said pilot signal and video signals are recorded in remaining portions of said tracks.

16. In an apparatus for reproducing information signals recorded in successive parallel tracks extending obliquely across a magnetic recording tape and comprised of a video signal recorded along with a tracking pilot signal of a frequency band lower than that of said video signal in main poritons of said tracks and a high-quality digitized audio signal recorded with said tracking pilot signal in an overscan section of each of said tracks and having a frequency band which, at least in part, overlaps said frequency band of the tracking pilot signal, the combination of:

reproducing head means for reproducing the signals recorded in said main portion and said overscan section of each of said tracks;

means for separating the signals reproduced from said main portion and said overscan section, respectively, of each track;

means for detecting a D.C. component of the signal reproduced from each said overscan section;

first voltage comparing means for comparing the level of the reproduced signal from each said overscan section in respect to the detected D.C. component thereof extracting said digitized audio signal as an output therefrom;

first subtracting means for subtracting said output of said first voltage comparing means from said signal reproduced from each said overscan section and thereby providing said tracking pilot signal as an output from said first subtracting means;

tracking servo means receiving said tracking pilot signal from said first subtracting means for causing said reproducing head means to precisely scan said tracks;

second subtracting means for subtracting said output of said first subtracting means from said signal reproduced from each said overscan section for obtaining said digitized audio signal therefrom;

means for detecting a D.C. component of said digitized audio signal obtained from said second subtracting means; and second voltage comparing means for comparing the level of said digitized audio signal obtained from said second subtracting means with the detected D.C. component thereof for obtaining said digitized audio signal with any errors therein due to said tracking pilot signal and other cross-talk from adjacent tracks being suppressed.

* * * * *